US012715089B2

(12) United States Patent
Chavez

(10) Patent No.: US 12,715,089 B2
(45) Date of Patent: Aug. 25, 2026

(54) SPECIALIZED TOOL FOR REPLACING AN ANCHOR PIN BUSHING ON LARGE TRUCKS AND TRAILERS

(71) Applicant: Jose Chavez, Windsor, CA (US)

(72) Inventor: Jose Chavez, Windsor, CA (US)

( * ) Notice: Subject to any disclaimer, the term of this patent is extended or adjusted under 35 U.S.C. 154(b) by 304 days.

(21) Appl. No.: 18/663,901

(22) Filed: May 14, 2024

(65) Prior Publication Data

US 2025/0353152 A1 Nov. 20, 2025

(51) Int. Cl.
*B25B 27/00* (2006.01)
*B25B 27/06* (2006.01)

(52) U.S. Cl.
CPC .......... *B25B 27/06* (2013.01); *B25B 27/0035* (2013.01)

(58) Field of Classification Search
CPC ..... B25B 27/06; B25B 27/0035; B25B 27/10; B25B 27/0021; B25B 27/146; B25B 27/24
See application file for complete search history.

(56) References Cited

U.S. PATENT DOCUMENTS

| | | | | | |
|---|---|---|---|---|---|
| 199,715 | A * | 1/1878 | Jenkins | B21D 28/34 | 83/688 |
| 3,209,445 | A * | 10/1965 | Moskovitz | B25B 27/06 | 29/275 |
| 4,619,027 | A * | 10/1986 | Ohannesian | B25B 27/0035 | 29/275 |
| 5,355,572 | A * | 10/1994 | Kammeraad | F01L 3/08 | 29/283 |
| D375,967 | S * | 11/1996 | Michener | D15/150 | |
| 5,730,021 | A * | 3/1998 | Johnson | B25D 17/02 | 173/132 |
| 6,415,492 | B1 * | 7/2002 | Jamison | B25B 27/04 | 29/254 |
| 6,427,304 | B2 * | 8/2002 | Kaibach | B25B 31/00 | 29/280 |
| 6,442,817 | B1 * | 9/2002 | Swanson | B25B 27/06 | 29/275 |

(Continued)

OTHER PUBLICATIONS

Maureen 29090 Anchor Bushing kit Fit for Removing and Installing 1⅜ Anchor bushings 11½" Long Drive That Allows The Bushing to be Driven, https://www.amazon.com/dp/B09Q3K2VVK?starsLeft=1&ref_=cm_sw_r_cso_sms_apan_dp_SKJCXS2VRAYQVZS2JYAT&th=1, Jan. 10, 2022.

(Continued)

*Primary Examiner* — Lee D Wilson
(74) *Attorney, Agent, or Firm* — My Patent Guys; Christopher Pilling; Colton Bangs

(57) ABSTRACT

A specialized tool for replacing an anchor pin bushing on a large truck or trailer is provided. The tool is a solid, cylindrical shaft designed to be driven into the anchor pin bushing by an operator using a manual hammer. The tool features a cutout segment that allows it to be maneuvered around the wheel hub assembly while driving the bushing, thus eliminating the need for a burdensome removal of the wheel hub assembly. The tool can be used to remove an old bushing and to install a new bushing into an eye of a brake frame housing. The tool may also include a removable installation sleeve, which is used to prevent a new bushing from being driven in too far. An alternate embodiment describes the specialized tool in a format designed to be driven by standard pneumatic air tools.

5 Claims, 6 Drawing Sheets

(56) References Cited

U.S. PATENT DOCUMENTS

| | | | | | |
|---|---|---|---|---|---|
| D477,763 | S * | 7/2003 | Hebert | D8/70 |
| D511,666 | S * | 11/2005 | Thompson | D8/70 |
| D570,385 | S * | 6/2008 | Chuo | D15/143 |
| 7,707,709 | B2 * | 5/2010 | Whitehead | B25B 27/06 29/256 |
| D637,216 | S * | 5/2011 | Michener | D15/150 |
| D875,494 | S * | 2/2020 | Widner | D8/51 |
| 11,117,246 | B2 * | 9/2021 | Whitehead | B25B 27/04 |
| 11,644,142 | B2 * | 5/2023 | Liu | F16L 55/18 138/97 |
| D1,027,047 | S * | 5/2024 | Wang | D21/402 |
| 2020/0171634 | A1 * | 6/2020 | Whitehead | B25B 27/0035 |
| 2025/0353152 | A1 * | 11/2025 | Chavez | B25B 27/06 |

OTHER PUBLICATIONS

Brake Pin & Bushing Driver Kit,https://www.toolsource.com/general-service-parts-c-302_539_825/brake-pin-bushing-driver-kit-p-125286.html?sourceid=googleps&gad=1.

* cited by examiner

SPECIALIZED TOOL FOR REPLACING AN ANCHOR PIN BUSHING ON LARGE TRUCKS AND TRAILERS

CROSS-REFERENCE TO RELATED APPLICATIONS

N/A

BACKGROUND OF THE INVENTION

1. Field of the Invention

The present invention relates to tools for automotive maintenance, but more particularly a specialized tool for replacing an anchor pin bushing on large trucks and trailers.

2. Description of Related Art

In the maintenance of large truck and trailer braking systems, it is common that an anchor pin and anchor pin bushing may need to be replaced. Normally, the wheel hub assembly has to be removed to do this as it partially blocks access to the bushing. Removal of the wheel hub is burdensome and takes a significant amount of time compared to the overall replacement of the bushing. Once the wheel hub is removed, there is direct access to the bearing and it can be driven straight through and out of the eye of the brake frame housing, and the new bushing can subsequently be driven straight in as well.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is an object of the present invention to provide a specialized tool for replacing an anchor pin bushing within a brake frame housing on large trucks and trailers without having to remove the wheel hub assembly, that is suitable for being driven by hand with a manual hammer. This is achieved through the unique shape of the bushing driver tool described in this invention. The bushing driver tool has a long, thick construction suitable for receiving the force from a manual hammer and transferring it precisely to an anchor pin bushing. The end of the driver where force is applied is broad and flat so that it is easy to hold with one hand, and strike with a manual hammer with the other hand. The driver shaft has a cutout section that allows the tool to be maneuvered around the wheel hub assembly while still allowing the tool to maintain its structural integrity after a long period of use.

It is another object of the invention to provide a specialized tool for replacing an anchor pin bushing within a brake frame housing, without removing a wheel hub assembly, configured for use with a pneumatic hand tool or air hammer.

It is a further object of the invention to provide a specialized tool comprising a solid, cylindrical shaft with a diameter narrowly smaller than the inner diameter of the bushing to be driven so that it fits tightly but can still slide inside the bushing; a first end of the cylindrical shaft having a flat surface; a round hole in the center of the first end of the cylindrical shaft extending into the shaft, wherein the round hole is configured to receive an anchor pin when the first end of the specialized tool is placed square into the bushing; a first raised segment of the cylindrical shaft having a diameter larger than the inner diameter of the bushing to be replaced; a second raised segment of the cylindrical shaft adjacent to the first raised segment, wherein the second raised segment has a larger diameter than the first raised segment; a cutout segment of the cylindrical shaft positioned below the second raised segment, wherein the cutout segment extends a first distance, and having a depth less than half the diameter of the cylindrical shaft, and the cutout segment allowing the cylindrical shaft to be maneuvered around the wheel hub assembly when the tool is placed square into the anchor pin bushing during use; and, a second end of the cylindrical shaft with a large, smooth face suitable for being struck with a manual hammer.

It is a further object of the invention to provide a specialized tool constructed from a single piece of steel.

It is a further object of the invention to provide a specialized tool further comprising a removable installation sleeve, the removable installation sleeve being a hollow cylinder of approximately 39 mm in length with an inner diameter narrowly larger than the diameter of the first raised segment so that it fits tightly around the first raised segment but can still slide, wherein the installation sleeve is configured to be slid onto the first end of the tool and abut the second raised segment, and the installation sleeve able to prevent a new bushing from being driven in too far by stopping progress when the sleeve abuts a brake frame housing.

It is a further object of the invention to provide a specialized tool of approximately 490 mm in overall length.

It is a further object of the invention to provide a specialized tool, wherein the length and depth of the cutout segment are approximately 136 mm and 8.7 mm, respectively.

The foregoing has outlined rather broadly the more pertinent and important features of the present disclosure so that the detailed description of the invention that follows may be better understood and so that the present contribution to the art can be more fully appreciated. Additional features of the invention, which will be described hereinafter, form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE INVENTION

Figure 1:
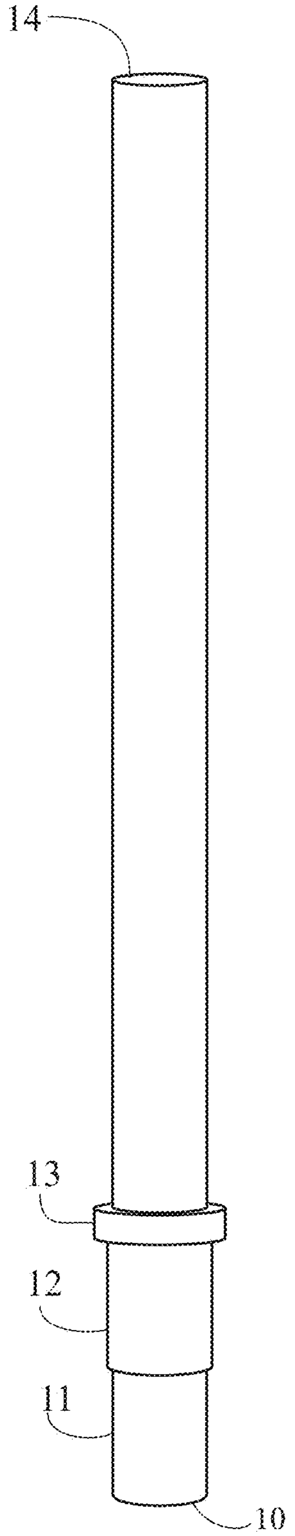
FIG. 1 is a rear perspective view of a specialized tool for replacing an anchor pin bushing according to an embodiment of the present invention.
Figure 2:
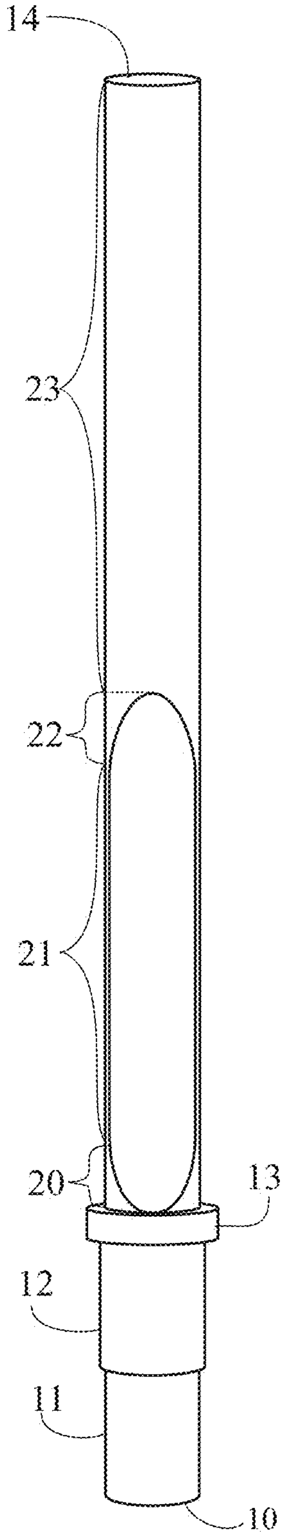
FIG. 2 is a front perspective view of the specialized tool for replacing an anchor pin bushing according to an embodiment of the present invention.
Figures 3, 4:
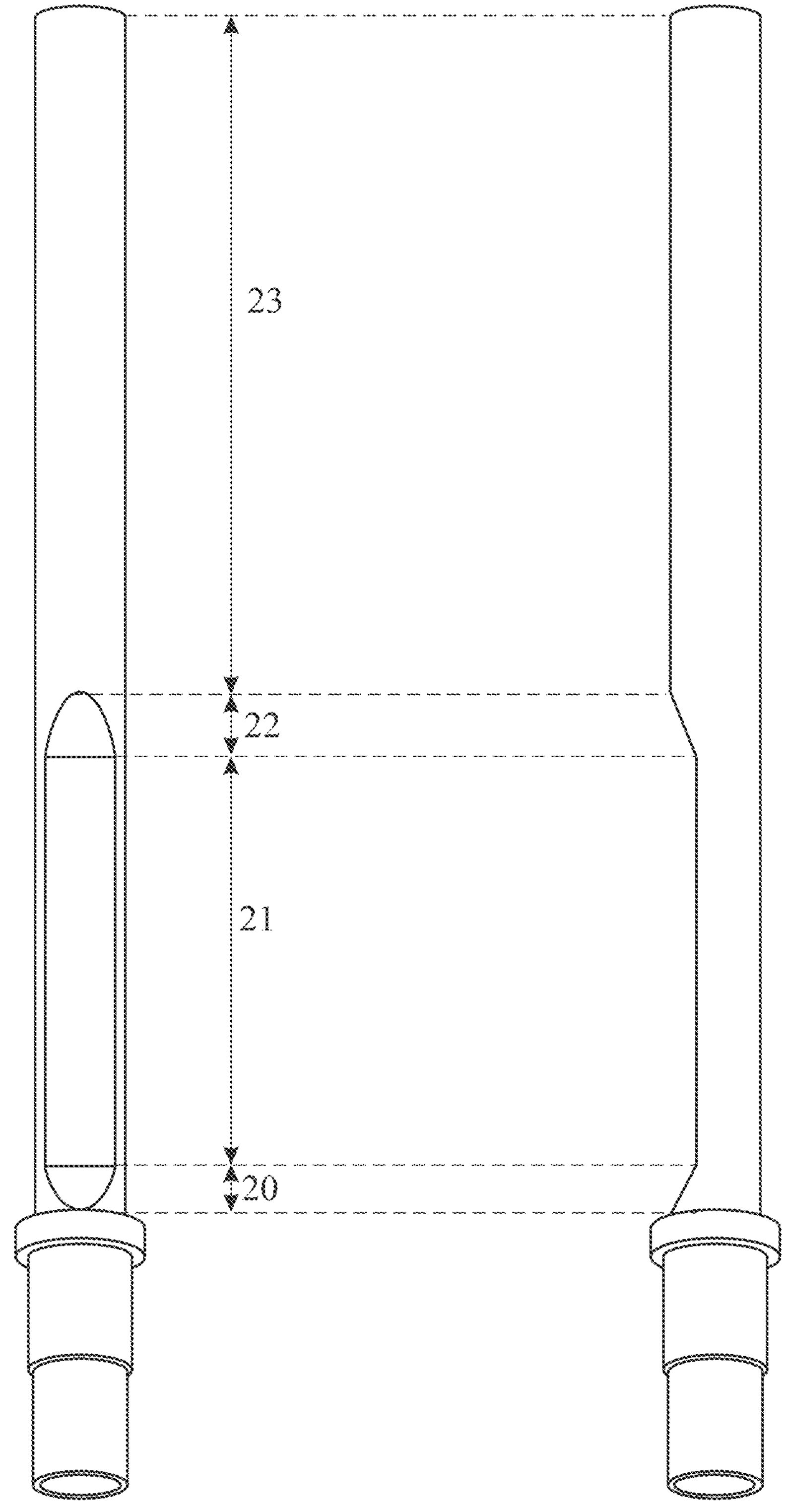
FIG. 3 is a front perspective view of the specialized tool for replacing an anchor pin bushing according to an embodiment of the present invention
FIG. 4 is a right side perspective view of the specialized tool for replacing an anchor pin bushing according to an embodiment of the present invention

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a specialized tool for replacing an anchor pin bushing on large trucks and trailers.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. The term "approximate" or "approximately," as used herein, shall refer to a range of values that are within [+/−10%] of a stated reference value. This range acknowledges the inherent variations found in manufacturing, measuring, and application processes, allowing for minor deviations that do not materially affect the novel functionality or utility of the invention. The term "narrowly" is defined to mean barely or by only a small margin. These terms generally refer to a range of numbers that one of skill in the art would consider equivalent to the recited values (i.e., having the same function or result). In many instances these terms may include numbers that are rounded to the nearest significant figure.

The present invention functions as a bushing driver configured to drive out a stuck anchor pin bushing, and subsequently drive in a new anchor pin bushing on a brake assembly of a wheel of a large truck or trailer. In one embodiment, a first end of the driver has an outer diameter narrowly smaller than the bushing to be removed so that it fits tightly but can still slide into the opening of the bushing. In one embodiment, a shaft runs between the first end and a second end, wherein the second end is positioned opposite to the first end. Advantageously, the shaft has a cut out segment of reduced size that enables the bushing driver to fit around the wheel assembly so that the first end can fit square into the bushing through the entire process of driving the bushing through the eye of the brake frame housing during use. In one embodiment, the shaft widens again between the cutout segment and the second end, at a comfortable diameter to be held by a hand of an operator while it is being driven by a manual hammer held by another hand of the operator. This widened shaft and second end also aid in the stability and integrity of the device. In one embodiment, the second end of the bushing driver is flat and broad in area in order to be easily struck by a hand-held manual hammer such as a sledgehammer.

The invention can be better appreciated with reference to FIGS. 1-11. In one embodiment, the bushing driver is comprised of a solid, cylindrical shaft with two opposite ends and several segments of the shaft having varying shapes and diameters. In one embodiment, the first end 10, which may also be referred to as the top end of the bushing driver, slides into the bushing and is flat and donut-shaped with an inner diameter of 25.75 mm. In one embodiment, the first end 10 has an outer diameter of 31.50 mm, narrowly smaller than the inner diameter of the bushing to be driven out, so that it fits tightly but is still able to slide within the bushing. In one embodiment, a first segment 11 of the tool begins at the first end 10 and extends 37.50 mm away from the first end 10. In one embodiment, segment 11 is a solid cylinder with an outer diameter of 31.50 mm and has a hollow center 30 starting at the first end 10 and extending 9.50 mm with an inner diameter equal to the inner diameter of the first end, 25.75 mm. The hollow center 30 is configured to receive an anchor pin fixed inside the anchor pin bushing when the first end of the bushing driver is placed square against the anchor pin bushing.

Still referring to the accompanying FIGS. 1-11, adjacent to the first segment 11 is a second segment 12 which is a solid cylinder with an outer diameter of 34.50 mm. In one embodiment, the second segment 12 is 38.50 mm in length. In one embodiment, adjacent to the second segment 12 is a third segment 13 which is a solid, short and wide segment that is 9.50 mm in length and 43.00 mm in diameter. The third segment 13 is configured to contact the brake frame housing to halt progression of the specialized tool through a hole in the brake frame housing in which the anchor pin bushing resides, once the anchor pin bushing has been driven out.

In one embodiment, adjacent to the third segment 13 is a fourth segment 20. The fourth segment starts to reduce the size of the cylindrical shaft of the cut out portion, which leads into the fifth segment 21 defined as the reduced size cut out portion of the tool. More specifically, the fifth segment 21 is a solid, non-cylindrical shape of length 136.00 mm and the cross-sectional shape of the fifth segment 21 is the major segment of a circle with diameter of 30.00 mm and a chord across the circle at a depth of 8.70 mm. The fourth segment 20 is solid and cylindrical with a diameter of 30.00 mm where it attaches to the third segment 13, and then tapering to become the same size and shape as the fifth segment 21 over the entire 16.00 mm length of the fourth segment 20. A sixth segment 22 is solid and a similar but opposite shape of the fourth segment 20, beginning as the same size and shape as the fifth segment 21 where it attaches to the fifth segment 21, and flaring to a circular cross-section with a diameter of 30.00 mm. In one embodiment, a seventh segment 23 is adjacent to the sixth segment 22 and is a solid cylinder of diameter 30.00 mm and length of 235.45 mm. Finally, the second end 14 forms the bottom end of the tool, opposite to the first end 10. The second end 14 is adjacent to the seventh segment 23 and is a smooth, solid circle with a diameter of 30.00 mm.

Figure 15A:
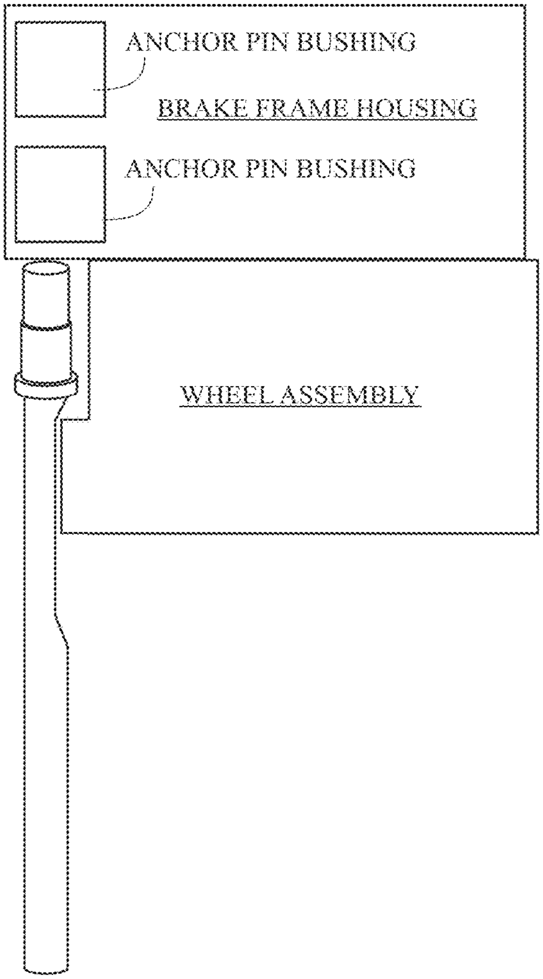
FIGS. 15A-B show the specialized tool for replacing an anchor pin bushing in use according to an embodiment of the present invention
Figure 15B:
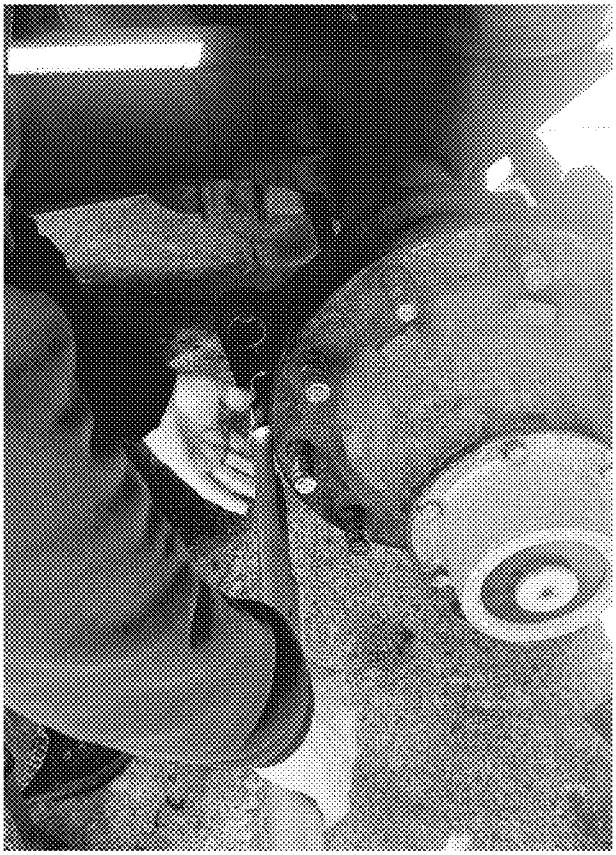

Referring now to FIGS. 15A-B, the best mode of using the bushing driver tool to drive out a bushing is shown. First, the bushing driver is oriented so that its cutout side is facing the wheel hub assembly. The first end 10 of the bushing driver is placed just inside the bushing with the anchor pin sliding into the hollow center 30 of the first segment 11 of the bushing driver. The operator holds on to the seventh segment 23 of the bushing driver with one hand and strikes the second end 14 of the bushing driver with a hammer held in the other hand. The operator continues striking the second end 14 of the bushing driver with the hammer until the bushing and anchor pin fall out of a back side of the eye of the brake frame housing.

Likewise, the best mode of using the bushing driver tool to install a new bushing into an eye of a brake frame housing is described herein. First, the new bushing is slid onto the first end 10 of the bushing driver. The bushing driver is oriented so that its cutout side is facing the wheel hub assembly and the first end 10 of the bushing driver is placed up to the front side of the eye of the brake frame housing so that the new bushing fits just inside the eye. The operator holds on to the seventh segment 23 of the bushing driver with one hand and strikes the second end 14 of the bushing driver with a hammer held in the other hand. The operator continues striking the second end 14 of the bushing driver with the hammer until the bushing is all the way into the eye.

Figure 5:
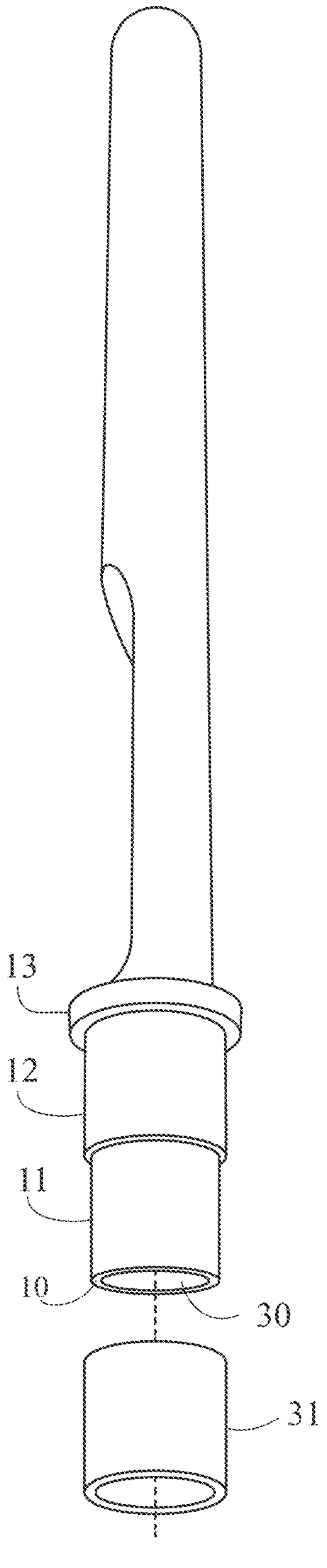
FIG. 5 is a right side perspective view of the specialized tool for replacing an anchor pin bushing with an installation sleeve according to an embodiment of the present invention.
Figure 6:
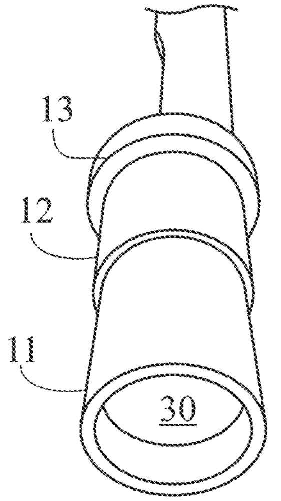
FIG. 6 is a top perspective partial view of the specialized tool for replacing an anchor pin bushing according to an embodiment of the present invention.
Figure 7:
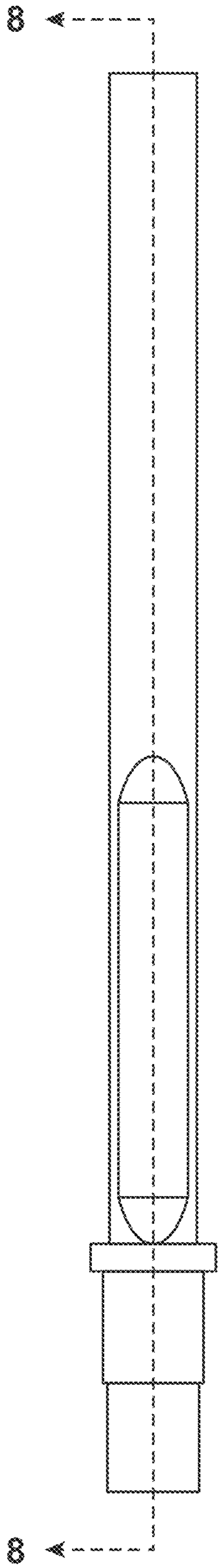
FIG. 7 is a front view of the specialized tool for replacing an anchor pin bushing according to an embodiment of the present invention.
Figure 8:
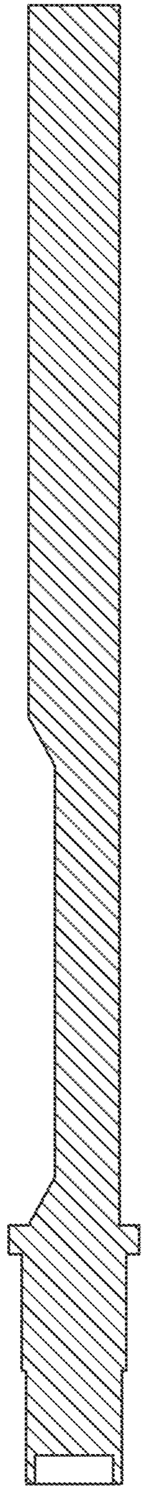
FIG. 8 is a sectional view taken along section lines 8-8 of FIG. 7.
Figure 9:
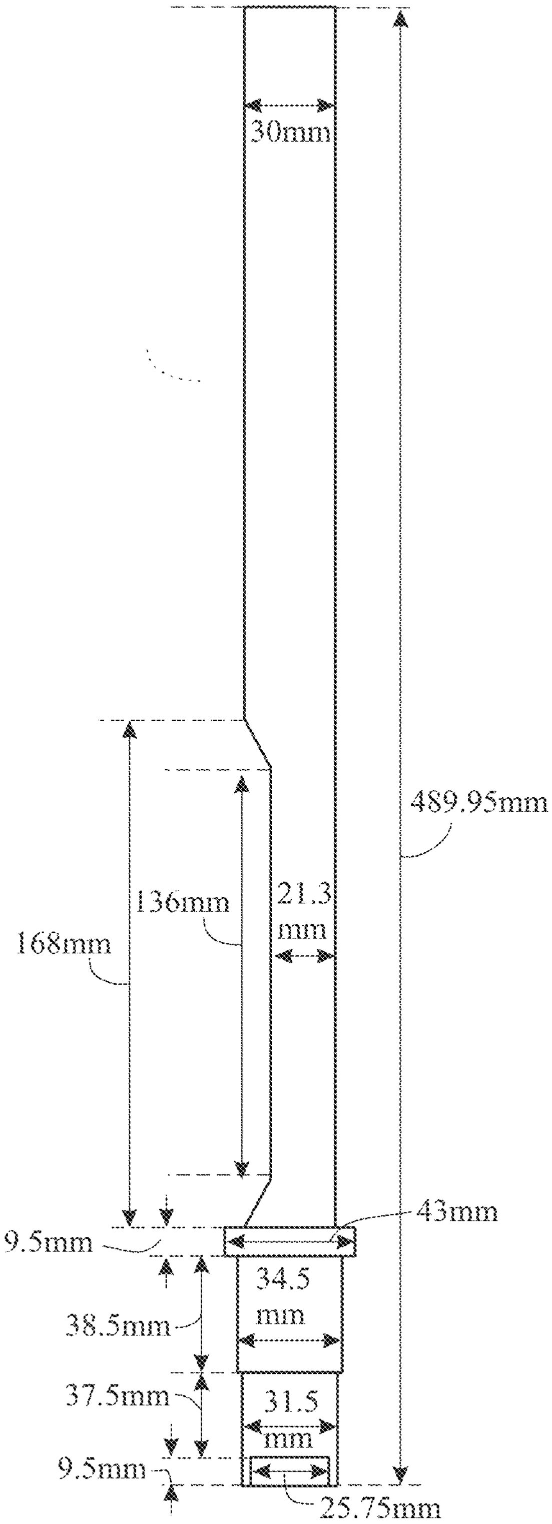
FIG. 9 is a dimensioned view of the sectional view of FIG. 8.
Figure 10:
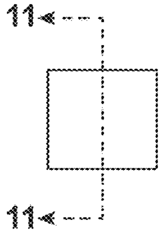
FIG. 10 is a front view of the installation tool according to an embodiment of the present invention.
Figure 11:
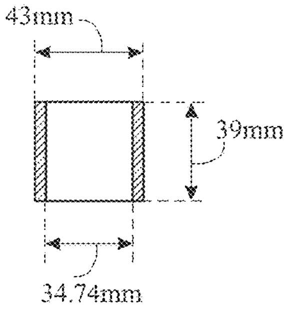
FIG. 11 is a sectional view taken along section lines 11-11 of FIG. 10.

In one embodiment seen in FIG. 5, an installation sleeve 31 is used with the bushing driver to prevent a new bushing from being driven in too far and extending through the back side of the eye. In one embodiment, the installation sleeve 31 is a hollow cylinder of length 39.00 mm. The outer diameter of the installation sleeve 31 is 43.00 mm and the inner diameter is 34.74 mm, narrowly larger than the diameter of the second segment 12 of the bushing driver tool so that it fits tightly around the second segment 12 but can still slide. During use, the installation sleeve 31 is slid onto the first end 10 of the bushing driver and slid down until it abuts the third segment 13 of the bushing driver. Next, a new bushing is then slid onto the first end 10 of the bushing driver until it abuts the installation sleeve 31. The new bushing can then be installed using the same method described above and the installation sleeve 31 will contact the brake frame housing when the new bushing is all the way into the eye, thus preventing the bushing from being driven in any further.

In one embodiment, the material of the bushing driver and installation sleeve is metal, such as steel or stainless steel.

Figure 12:
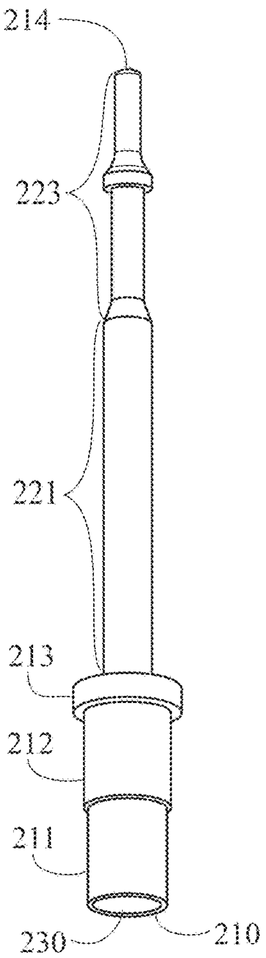
FIG. 12 is a front perspective view of an alternate specialized tool for replacing an anchor pin bushing according to an embodiment of the present invention.
Figure 13:
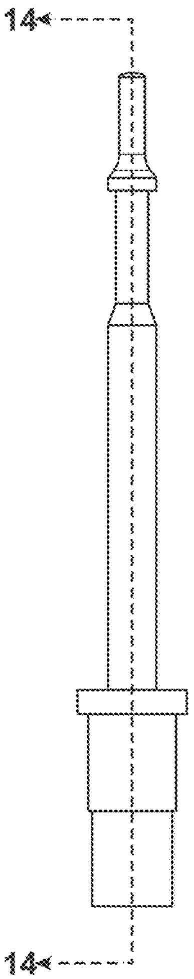
FIG. 13 is a front view of the alternate specialized tool for replacing an anchor pin bushing according to an embodiment of the present invention.
Figure 14:
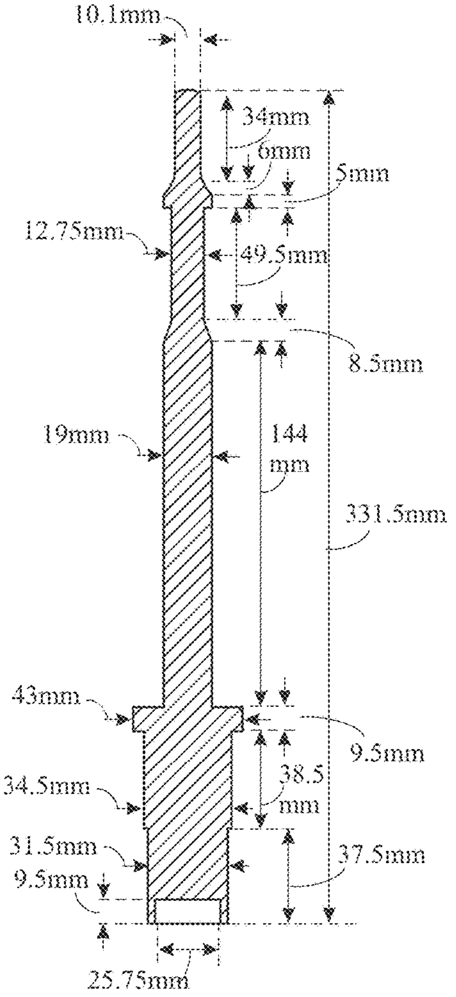
FIG. 14 is a sectional view taken along section lines 14-14 of FIG. 13.

Referring now to FIGS. 12-14, an alternative bushing driving tool enabling the use of a pneumatic hand tool or air hammer is illustrated. In one embodiment, the alternative bushing tool features similar components to the previous embodiment, including a first end 210 with a hollow center 230, first segment 211, second segment 212, and third segment 213 all functioning identically to the first embodiment. As the alternative bushing tool is configured for use with a power tool, a body section or fourth segment 221 is configured to be a diameter enabling the bushing driver to fit around the wheel assembly so that the first end can fit square into the bushing through the entire process of driving the bushing through the eye of the brake frame housing during use. In one embodiment, the diameter of the fourth section is 19 mm. Advantageously, segment 223 along with the second end 214 of the specialized tool are shaped and configured to be compatible with standard pneumatic air tools, powered by compressed air as well known in the art.

For stabilization and integrity of the tool, it is critical that the tool is constructed from a single piece of material, such as steel as previously mentioned.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to “first,” “second,” “third,” and etc. members throughout the disclosure (and in particular, claims) are not used to show a serial or numerical limitation but instead are used to distinguish or identify the various members of the group.

What is claimed is:

1. A tool for replacing an anchor pin bushing within a brake frame housing, without removing a wheel hub assembly, comprising:

a solid, cylindrical shaft with a diameter narrowly smaller than an inner diameter of the anchor pin bushing to be driven so that the solid cylindrical shaft fits tightly but can still slide inside the anchor pin bushing;

a first end of the cylindrical shaft having a flat surface;

a round hole in the center of the first end of the cylindrical shaft extending into the shaft, wherein the round hole is configured to receive an anchor pin when the first end of the tool is placed square into the anchor pin bushing;

a first raised segment of the cylindrical shaft having a diameter larger than the inner diameter of the anchor pin bushing to be replaced;

a second raised segment of the cylindrical shaft adjacent to the first raised segment, wherein the second raised segment has a larger diameter than the first raised segment;

a cutout segment of the cylindrical shaft positioned below the second raised segment, wherein the cutout segment extends a first distance, and having a depth less than half the diameter of the cylindrical shaft, and the cutout segment allowing the cylindrical shaft to be maneuvered around the wheel hub assembly when the tool is placed square into the anchor pin bushing during use; and, a second end of the cylindrical shaft with a large, smooth face suitable for being struck with a manual hammer.

2. The tool of claim 1, wherein the specialized tool is constructed from a single piece of steel.

3. The tool of claim 1, further comprising a removable installation sleeve, the removable installation sleeve being a hollow cylinder of approximately 39 mm in length with an inner diameter narrowly larger than the diameter of the first raised segment so that the removable installation sleeve fits tightly around the first raised segment but can still slide, wherein the installation sleeve is configured to be slid onto the first end of the tool and abut the second raised segment, and the installation sleeve able to prevent a new bushing from being driven in too far by stopping progress when the sleeve abuts a brake frame housing.

4. The tool of claim 1, wherein the overall length of the specialized tool is approximately 490 mm.

5. The tool of claim 1, wherein the length and depth of the cutout segment are approximately 136 mm and 8.7 mm, respectively.

* * * * *